Sept. 23, 1958

W. D. TRACY 2,852,853

BEARING TEST APPARATUS

Filed March 1, 1956

WARD D. TRACY
INVENTOR.

BY Lyon & Lyon

ATTORNEYS

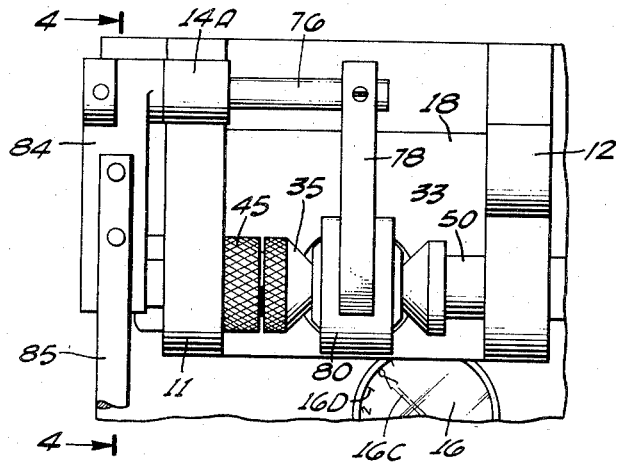
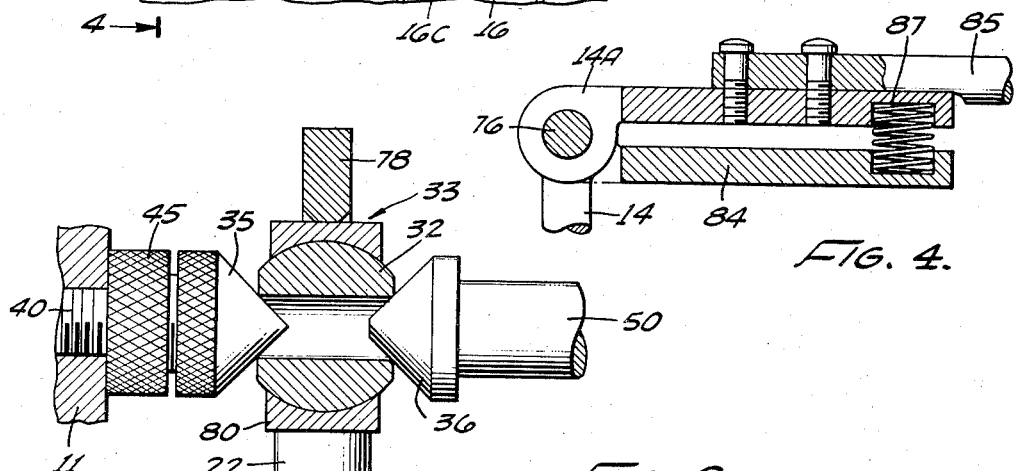
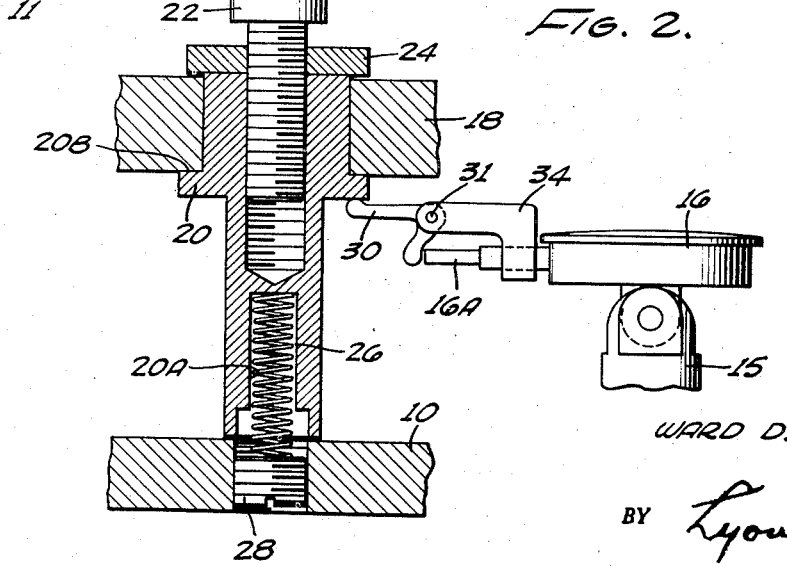

United States Patent Office 2,852,853
Patented Sept. 23, 1958

2,852,853

BEARING TEST APPARATUS

Ward D. Tracy, Glendora, Calif., assignor to Southwest Products Co., Duarte, Calif., a corporation of California Application March 1, 1956, Serial No. 568,878

3 Claims. (Cl. 33—174)

The present invention relates to apparatus for testing the tolerance or clearance between an inner race member and an outer race member of a bearing of the type in which the inner race member has a bore extending therethrough.

The present arrangement described herein includes generally means for releasably securing an inner race member in a central stationary position, a manually operated lever system incorporating means whereby a force of limited intensity is applied to the outer race member, and a deflection gauge arranged to measure the amount of movement of the outer race member when the force is applied.

An object of the present invention is to provide bearing test apparatus which is relatively simple and which is capable of reproducing its measurements with accuracy.

Another object of the present invention is to provide bearing test apparatus which permits measurements of tolerance to be made quickly and accurately.

Another object of the present invention is to provide bearing test apparatus of this character which is readily adjustable to accommodate and measure the tolerance between the inner and outer race members of different sized bearings.

Another object of the present invention is to provide a bearing test apparatus of this character which is entirely manually operated and which incorporates means whereby the testing force applied between the inner and outer race member is limited in intensity to assure reproducibility of measurements.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

Figure 2 is a sectional view taken generally on the line 2—2 of Figure 1.

Figure 3 is a top plan view of a portion of the apparatus shown in Figure 1.

Figure 4 is a sectional view taken on the line 4—4 of Figure 3.

Figures 1, 5:
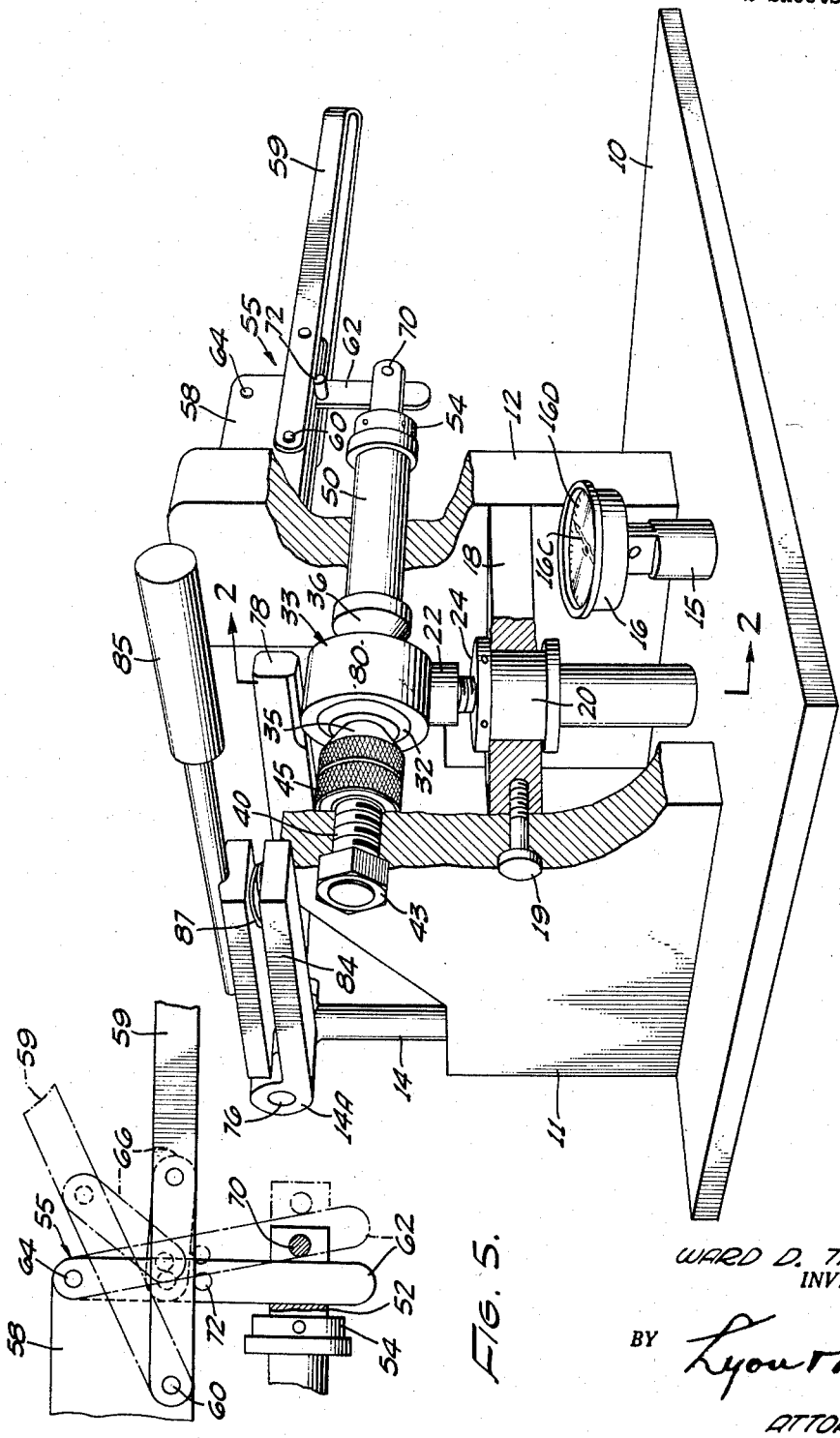
Figure 1 is essentially a perspective view of testing apparatus embodying features of the present invention with certain parts shown in section.
Figure 5 illustrates details of the manually operated toggle locking mechanism.

The testing apparatus is mounted on a metallic base plate 10 to which is secured a pair of spaced plates or standards 11, 12, a third standard or post 14, and a pedestal 15 supporting the deflection gauge 16.

A horizontal plate 18 extends between the two standards 11 and 12 and is secured thereto by, for example, bolts 19.

The plate 18 is centrally apertured to slidably receive a plunger 20. An anvil 22 having a threaded shank is threaded in the plunger 20 and a jam nut 24 threaded on such shank secures the anvil 22 in an adjusted position. The plunger 20 has a bore 20A in its lower end for receiving a prestressed coil compression spring 26. The spring 26 has its lower end bearing against a releasable plug 28 threaded in the plate 10. The plunger 20 has an annular shoulder 20B engaged by one arm of a bell crank lever 30 which is pivoted at 31 on an extension 34 of the gauge 16 which, in turn, is stationarily supported on the pedestal 15.

The gauge 16 is of conventional construction and includes a movable actuating plunger 16A engaging the other arm of the bell crank lever 30, so that the amount of downward movement of the plunger 20 may be read in terms of the relative position of the movable gauge pointer 16C in relationship to the graduations on the stationary gauge dial 16D.

The inner race member 32 of the bearing 33 is arranged to be securely held in fixed position by a pair of conical ended members 35 and 36 which may be adjusted laterally to accommodate different sized bearings.

Thus, the conical ended member 35 is knurled and threaded on one end of a bolt 40 passing through an apertured portion of the wall 11. This bolt 40 is clamped on the wall 11 by the nut 43 and the adjustable knurled nut 45 threaded on the bolt 40.

The other conical ended member 36 is formed on the plunger 50 which is slidably mounted in an apertured portion of the wall 12. The plunger 50 has an actuating member 52 threaded therein, and a jam nut 54 on the threaded portion of the actuating member 52 abuts the plunger 50 to lock the plunger 50 in adjusted position so that the inner race member 32 is securely locked in position upon operation of the manually operated toggle locking mechanism 55 which is now described in detail.

The mechanism 55 includes a U-shaped bent support 58 secured to the outer wall of the standard 12. The mechanism 55 includes also a manually operated lever 59 pivoted by means of pivot pin 60 on the support 58, an arm 62 pivoted by means of pivot pin 64 on the support 58 and a link 66 having its ends pivotally secured respectively on intermediate portions of the arms 59 and 62, so as to secure a toggle action. The lower end of the arm 62 extends downwardly through a bifurcated portion of the actuating member 52 and a pin 70 extends between the two legs which define such bifurcated portion. A stop pin 72 is mounted on the lever 62 so as to limit movement of the lever 59 in its locked position illustrated in Figure 1.

The aforementioned standard 14 is provided with an annular bearing 14A through which a pivotal shaft 76 extends. A lever 78 has one of its ends secured on the lever 76, the other end of the lever 78 being adapted to contact the outer race member 80 of bearing 33. The shaft 76 has also secured thereto a second lever 84. A third manually operated lever 85 is pivotally mounted on the shaft 76 and a coil spring 87 is disposed between the levers 84 and 85 for purposes of limiting the intensity of the force transferred to the lever 78.

In operation of the apparatus with the inner race member 32 secured, as shown in Figure 1, by the conical ended members 35 and 36, a manual force is applied to the lever 85 and the deflection of the gauge pointer 16C is noted. This deflection is a measurement of the "play" tolerance or clearance between the inner and outer race members. For this purpose it is noted that the spring 26 constantly presses the anvil 22 in engagement with the outer race member 80 and that a spring (not shown) incorporated in the gauge 16 serves to press the movable plunger 16A constantly into engagement with the bell crank lever 30.

It has been observed that the amount of deflection is, to a certain extent, influenced by the amount of force applied to the lever 78, and for that reason a resilient coupling in the form of the spring 87 is interposed between the manually operated lever 85 and the lever 78 whereby excessive forces are absorbed in the spring 87. This particular arrangement allows greater reproducibility of measurements.

After a measurement is made, the lever 59 is moved upwardly to unlock the mechanism 55 so that at the same time the bearing 33 is released and may be removed. Another bearing is placed on the anvil 22 and the lever 59 is again lowered to its locking position wherein it firmly maintains the inner race member in a locked central position since the conical shaped members 35 and 36 automatically produce centering when the lever 59 is moved to its locked position.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In testing apparatus of the character described comprising a base, a pair of spaced upstanding standards mounted on said base, a horizontally extending plate extending between and attached to said standards, said plate having an apertured portion, a plunger slidably mounted in said apertured portion, said plunger having a bore in its lower end, a coil compression spring in said bore, a plug threaded in said base and abutting one end of said spring, the other end of said spring abutting said plunger, an anvil threaded in the upper end of said plunger, a jam nut on said threaded anvil abutting said plunger, a deflection gauge mounted on said base, said gauge including an actuating element contacting a portion of said plunger, one of said standards having an apertured portion, a threaded bolt passing through said standard apertured portion, a nut threaded on said bolt engaging one side of said one standard, a knurled jam nut threaded on said bolt and engaging the other side of said one standard, a conical pointed inner race engaging member threaded on said bolt, the other one of said standards having an apertured portion, an inner race engaging plunger slidably mounted in the last-mentioned apertured portion, said race engaging plunger having a conical tip which is horizontally aligned with said conical pointed inner race engaging member, an actuating member threaded in one end of the last-mentioned plunger, a jam nut threaded on said actuating member and abutting said last-mentioned plunger, a releasable manually operated toggle mechanism mounted on said other standard and engaging said actuating member to actuate said last-mentioned plunger, a third standard extending upwardly from said base and secured thereto, a bearing on the upper end of said third standard, a shaft journalled for pivotal movement in said bearing, an outer race engaging arm secured on said shaft, a second actuating arm secured on said shaft, a manually operated lever pivotally mounted on said shaft, a coil spring disposed between said second arm and said manually operated lever, said conical pointed member and said conical tip being arranged to enter and engage opposite end portions of an apertured inner race member of a bearing, and said outer race engaging arm being arranged to engage the outer race member of said bearing at a region substantially midway between said conical pointed member and said conical tip.

2. In testing apparatus of the character described comprising a base, a pair of spaced upstanding standards mounted on said base, a horizontally extending plate extending between and attached to said standards, said plate having an apertured portion, a plunger slidably mounted in said apertured portion, said plunger having a bore in its lower end, a coil compression spring in said bore, a plug threaded in said base and abutting one end of said spring, the other end of said spring abutting said plunger, a deflection gauge mounted on said base, said gauge including an actuating element contacting a portion of said plunger, one of said standards having an apertured portion, a threaded bolt passing through said standard apertured portion, a conical pointed inner race engaging member on said bolt, the other one of said standards having an apertured portion, an inner race engaging plunger slidably mounted in the last-mentioned apertured portion, said race engaging plunger having a conical tip which is horizontally aligned with said conical pointed inner race engaging member, a releasable manually operated toggle mechanism mounted on said other standard and engaging said last-mentioned plunger to actuate the same, a third standard extending upwardly from said base and secured thereto, a bearing on said third standard, a shaft journalled for pivotal movement in said bearing, an outer race engaging arm secured on said shaft, a second actuating arm secured on said shaft, a manually operated lever pivotally mounted on said shaft, a coil spring disposed between said second arm and said manually operated lever, said conical pointed member and said conical tip being arranged to enter and engage opposite end portions of an apertured inner race member of a bearing, and said outer race engaging arm being arranged to engage the outer race member of said bearing at a region substantially midway between said conical pointed member and said conical tip.

3. In testing apparatus of the character described comprising a base, a pair of spaced upstanding standards mounted on said base, a plate extending between and attached to said standards, said plate having an apertured portion, a plunger slidably mounted in said apertured portion, said plunger having a bore in its lower end, a coil compression spring in said bore, a plug threaded in said base and abutting one end of said spring, the other end of said spring abutting said plunger, an anvil on the upper end of said plunger, means adjustably mounting said anvil on said plunger, a deflection gauge mounted on said base, said gauge including an actuating element contacting a portion of said plunger, one of said standards having an apertured portion, a conical pointed inner race engaging member on said one standard, means adjustably mounting said race engaging member on said one standard, the other one of said standards having an apertured portion, an inner race engaging plunger slidably mounted in the last-mentioned apertured portion, said race engaging plunger having a conical tip which is horizontally aligned with said conical pointed inner race engaging member, a releasable manually operated toggle mechanism mounted on said other standard and engaging said race engaging plunger to actuate the same, a third standard extending upwardly from said base and secured thereto, a bearing on the upper end of said third standard, a shaft journalled for pivotal movement in said bearing, an outer race engaging arm secured on said shaft, a second actuating arm secured on said shaft, a manually operated lever pivotally mounted on said shaft, a coil spring disposed between said second arm and said manually operated lever, said conical pointed member and said conical tip being arranged to enter and engage opposite end portions of an apertured inner race member of a bearing, and said outer race engaging arm being arranged to engage the outer race member of said bearing at a region substantially midway between said conical pointed member and said conical tip.

References Cited in the file of this patent

UNITED STATES PATENTS

| | | |
|---|---|---|
| 2,419,280 | Neff | Apr. 22, 1947 |
| 2,427,924 | Rose | Sept. 23, 1947 |
| 2,439,552 | Walters | Apr. 13, 1948 |
| 2,525,068 | Ericson | Oct. 10, 1950 |
| 2,636,379 | Van Dorn | Apr. 28, 1953 |
| 2,637,908 | Hedman | May 12, 1953 |